United States Patent [19]

O'Lenick, Jr. et al.

[11] Patent Number: 5,010,173
[45] Date of Patent: Apr. 23, 1991

[54] FREE RADICAL STABILIZED ALKOXYLATES

[75] Inventors: Anthony J. O'Lenick, Jr., Lilburn, Ga.; John C. Miller, Hawthorn Woods, Ill.; J. Michael Clumpner, Delavan, Wis.

[73] Assignee: LCE Partnership, Lake Geneva, Wis.

[21] Appl. No.: 532,856

[22] Filed: Jun. 4, 1990

Related U.S. Application Data

[63] Continuation-in-part of Ser. No. 418,630, Oct. 10, 1918.

[51] Int. Cl.$^5$ ..................... C08G 65/10; C08L 71/02
[52] U.S. Cl. .................... 528/408; 524/186; 524/189; 524/714; 568/581; 568/582; 568/620
[58] Field of Search ............... 524/186, 184, 714; 528/408; 568/620, 581, 582

[56] References Cited

U.S. PATENT DOCUMENTS 3,317,508  5/1967  Winquist et al. ............... 568/620 X
3,682,875  8/1972  O'Sullivan et al. .............. 526/220
4,306,953  12/1981  Schlesinger .................... 528/408 X

FOREIGN PATENT DOCUMENTS 1271613  4/1972  United Kingdom .

Primary Examiner—Earl Nielsen

[57] ABSTRACT

The present application relates to a novel method of stabilizing the molecular weight of alkoxylates and stable compositions. The polyoxyalkylene compounds have incorporated into them, from the time of reaction of the alkylene oxide, a free radical type inhibitor which significantly improves stability of both the polymer.

18 Claims, No Drawings

FREE RADICAL STABILIZED ALKOXYLATES

This application is a continuation in part of Ser. No. 07/418,630 filed Oct. 10, 1989.

FIELD OF INVENTION

The present invention relates to novel methods of stabilizing polyoxyalkylene compounds by inclusion of small amounts of stable free radicals compounds which act to inhibit degradation of the polymer by minimizing the by product and side reactions which occur and break the polyoxyalkylene backbone.

BACKGROUND OF THE INVENTION

It is highly desirable to be able to produce polyoxyalkylene glycols to a variety of molecular weights. The lower molecular weight materials (200 mwu to 1,000 mwu) are liquids which are used in many varied applications areas, like fiber lubrication. Higher molecular weight materials (2,000 mwu to 6,000 mwu) are useful in the preparation of soil release polymers by the reaction with terephthalic acid and its esters. Ultra high molecular weight materials (over 10,000 mwu) are useful as waxes in many personal care applications.

All of these applications require that the polyoxyalkylene compound used (a) be capable of being produced on a repeated basis to a specified average molecular weight (i.e. have a reproducible molecular weight distribution) and (b) to be able to stand up to thermal and other degradations in the various applications in which they are used.

All polyoxyalkylene derivatives have a common feature, that is the presence of an ether bond derived from the reaction of ethylene or propylene oxide;

—CH$_2$CH$_2$—O—CH$_2$CH$_2$—O— or
—CH$_2$(CH$_3$)CH—O—

We have found that these bonds in polymeric species are degraded not only during the polymerization reaction but also after the reaction is complete. The degradation is accelerated by the presence of oxygen. Polyoxyalkylene chains break down into lower molecular weight species, and much of the performance attributes are lost.

This degradation is a major concern for the ultra high molecular weight species. While it is known in the art, that in order to achieve high molecular weight species of polyoxyalkylene compounds, exotic catalysts have to be used. But it was not until this invention, that it was recognized that the degradation could be arrested by incorporation of stable free radical compounds, most importantly nitroxides.

Antioxidants are well known, but the "standard antioxidants" are ineffective in the prevention of this specific degradation. The use of stable free radical compounds has surprisingly been found to be effective in preventing degradation. A variety of "standard antioxidants" have been shown to inhibit or retard vinyl polymerization. The commonly used inhibitors appear to function by reacting in some manner with an initiator radical to yield a species of lower reactivity that results in a lower tendency to continue chain propagation. These "standard antioxidants", which are ineffective in our invention, include phenols, quinones, aromatic nitro and nitroso compounds, amines and thiol compounds.

Stable free radicals have been known for many years and exist in the patent literature, but have been used primarily, if not exclusively in the prevention of vinyl reactive systems. U.S. Pat. No. 4,670,131 issued to Ferrell discloses the use of stable free radical compounds in the prevention of polymerization of olefinic materials. This process relates to the reaction of a vinyl containing material to make a saturated higher molecular weight species. Clearly, this reaction has been understood in terms of free radical chemistry. Free radical inhibitors or scavengers inhibit or retard the polymerization of chain propagating reactions in vinyl monomer systems. The mechanism is thought to be a scavenger of the free radicals which form on the monomer. Since the free radical scavenger is stable, it reacts rapidly with free radicals of the monomer, which form in low concentrations.

In addition to abstraction, several compounds retard vinyl polymerization by radical addition which again produces a radical species which is not reactive toward the monomer. Quinone type inhibitors are probably the best example of this kind of inhibition mechanism.

It was not originally appreciated that the degradation process of polyoxyalkylene compounds was free radical like in nature, since the typical inhibitors like phenols, quinones, aromatic nitro and nitroso compounds, amines and thiol compounds were of no value in stabilizing the polyoxyalkylene products. We have discovered that in order to develop an inhibitor for polyoxyalkylene polymers, a different type of approach must be employed. Stable free radicals, such as NOVA INHIBITOR 469, (a nitroxide type stable free radical) provide such a system not only for the polyoxyalkylene compounds but also for derivatives like soil release polymers. These stable free radicals are far too stable to initiate polymerization, but their free electron is available to immediately react with any radical initiator, rendering the potential initiator totally inactive. This class of inhibitors has been found to effective in protecting polyoxyalkylene polymers from free radical type degradation which reduces molecular weight.

The desired reaction forming polyoxyalkylene polymers is represented generically as follows

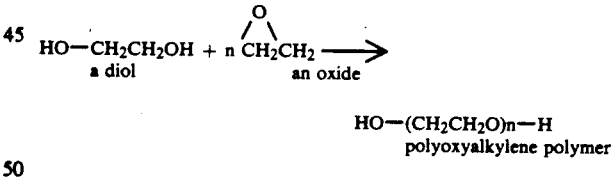

HO—(CH$_2$CH$_2$O)n—H
polyoxyalkylene polymer

During the reaction, most importantly in molecular weights in excess of 1000 MWU, the terminal hydroxyl group can eliminate producing terminal unsaturation. The terminal unsaturation has the following structure;

HO—(CH$_2$CH$_2$O)(n−1)—CH=CH$_2$

The continued polymerization of this compound to higher molecular weights is blocked by the conversion. We have surprisingly found that the inclusion of between 0.00000001 and 1.0 percent of a stable free radical into the diol prior to reaction will prevent the formation of the terminal unsaturated material allowing for the preparation of higher molecular weight more chemically pure polymers.

Additionally, the polyoxyalkylene chain can degrade into lower molecular weight products. This is observed particularly when aggressive conditions of temperature and catalyst concentrations are used in the polymerization reaction.

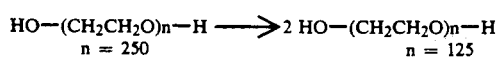

Inclusion of an effective inhibitory amount of stable free radical inhibits this reaction as well. The preferred stable free radical is a nitroxide.

OBJECT OF THE INVENTION

It is the objective of this invention is to provide stable polyoxyalkylene compositions with improved stability. More specifically, the present invention is directed to a composition which includes a traditional polyoxyalkylene and an effective inhibitory amount of a stable free radical compound, which stops the degradation of the ether bond and consequently stabilized the molecular weight of the polymer.

THE INVENTION

The present application relates to a novel method of stabilizing the molecular weight of polyoxyalkylene, both as prepared and during storage. The application also discloses stable compositions. The polyoxyalkylene compounds have incorporated into them, from the time of reaction of the alkylene oxide, a free radical type inhibitor which significantly improves stability of the resulting polymer.

The incorporation of an effective inhibitory concentration of a stable free radical compound has also been discovered to inhibit the formation of terminal unsaturation compounds, a undesired by product of the alkoxylation process.

Stable free radicals useful in the process of the present invention are described in U.S. Pat. Nos. 3,481,953; 3,489,522; 3,507,867 and 3,453,288. They are marketed by Aldrich as Doxyl and Proxyl Spin Labels. Some examples are;
Doxyl-cyclohexane (Aldrich #29,397-7),
5 Doxyl-decane (Aldrich #29,399-7),
3-(Aminomethyl)-proxyl (Aldrich #27,018-0),
2-(acetomercurl)-4,4,5,5-tetramethyl-2imidazolin-
  1yloxy-3-de (Aldrich #25,325-9),
Di-tert-butyl nitroxide,
galvinoxyl,
2,2-diphenyl-1-picrylhydrazyl hydrate,
bisphenylene-B-phenylallyl,
3-carbamoyl-2,2,5,5-tetramethyl-3-pyrrolin-1-yloxy, The most effective product tested is available from Nova Molecular Technology White Water Wis. and is sold under the trade name NOVA INHIBITOR 469 (a nitroxide type stable free radical).

We have incorporated these materials into the raw materials used in the alkoxylation process, prior to heat up and have found that not only do we obtain less by-products, we also get a product with a more stable molecular weight.

In order to show this, we prepared a nominal 10,000 MWU polypropylene glycol and a nominal 10,000 MWU polyethylene glycol polymer. We observed the hydroxyl value as an indication of molecular weight and also looked at degradation as a function of time and temperature.

EXAMPLES

Example 1

To a suitable vessel add 62.0 pounds of ethylene glycol. Apply nitrogen sparge. Add 15.0 pounds of KOH, under good agitation. Heat to 220-240 F. and apply vacuum for 30 minutes. Add 9,938.0 pounds of ethylene oxide slowly maintaining temperature at between 260-290 F. and pressure at between 45 and 90 psig. After all the oxide has been added, hold 2 hrs then cool to ambient.

Example 2-9

Example 1 was repeated only this time before the heat up the indicated number of ppm of the stable free radical indicated was added.

| Example # | Type of Stable Free Radical | Concentration (ppm) |
|---|---|---|
| 2 | Di-tert-butyl nitroxide, | 100 |
| 3 | Galvinoxyl | 100 |
| 4 | 2,2-diphenyl-1-picrylhydrazyl hydrate, | 100 |
| 5 | Bisphenylene-B-phenylallyl, | 100 |
| 6 | NOVA INHIBITOR 469 (a nitroxide type stable free radical) | 100 |
| 7 | Di-tert-butyl nitroxide | 10 |
| 8 | NOVA INHIBITOR 469 (a nitroxide type stable free radical) | 10 |
| 9 | NOVA INHIBITOR 469 (a nitroxide type stable free radical) | 1 |

The desired product from examples conforms to the following structure;

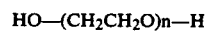

wherein n is 227.

Example 10

To a suitable vessel is added 76.0 pounds of propylene glycol. Apply nitrogen sparge. Add 15 pounds of KOH, under good agitation. Heat to 220-240 F. and apply vacuum for 30 minutes. Add 9,924 pounds of propylene oxide at 290-300 F. and 45 psig. After all the propylene oxide has been added, hold 2 hrs then cool to ambient.

Example 11-19

Example 10 is only this time adding the specified amount of the specified free radical inhibitor before heating up the reaction mass.

| Example # | Type of Stable Free Radical | Concentration (ppm) |
|---|---|---|
| 11 | Di-tert-butyl nitroxide, | 100 |
| 12 | Galvinoxyl | 100 |
| 13 | 2,2-diphenyl-1-picrylhydrazyl hydrate, | 100 |
| 14 | Bisphenylene-B-phenylallyl, | 100 |
| 15 | NOVA INHIBITOR 469 (a nitroxide type stable free radical) | 100 |
| 16 | Di-tert-butyl nitroxide | 10 |
| 17 | NOVA INHIBITOR 469 (a nitroxide type stable free radical) | 10 |
| 18 | NOVA INHIBITOR 469 (a nitroxide type stable free radical) | 1 |
| 19 | Hydroquinone monomethyl ether (an antioxidant but not a stable free radical type) | 100 |

The desired product from examples conforms to the following structure;

HO—(CH$_2$CH(CH$_3$O)n—H wherein n is 168. Theoretical molecular weight is 10,000 mwu.

| Initial Molecular Weight | |
|---|---|
| Example | Initial Molecular Weight |
| 1 | 7,800 |
| 12 | 9,000 |
| 3 | 9,500 |
| 14 | 9,300 |
| 5 | 9,000 |
| 16 | 9,100 |
| 17 | 9,050 |
| 8 | 9,150 |
| 9 | 8,900 |
| 19 | 8,000 |

As can be seen the molecular weight achieved is enhanced by incorporation of the stable free radical. This is because the stable free radical minimizes side reactions and by products.

Temperature Stability

Samples were then heated to 200 C. and the % reduction in molecular weight as a function of time was monitored.

| | % Reduction in Mol Weight Time in hours | | | | | |
|---|---|---|---|---|---|---|
| Example | 1 | 3 | 5 | 7 | 9 | 11 |
| 1 | 0.3 | 0.5 | 0.6 | 0.7 | 0.75 | 0.8 |
| 12 | 0.1 | 0.1 | 0.1 | 0.2 | 0.3 | 0.3 |
| 3 | 0.1 | 0.2 | 0.2 | 0.2 | 0.3 | 0.3 |
| 14 | 0.2 | 0.2 | 0.2 | 0.3 | 0.3 | 0.3 |
| 5 | 0.1 | 0.1 | 0.2 | 0.3 | 0.3 | 0.3 |
| 16 | 0.0 | 0.1 | 0.3 | 0.3 | 0.3 | 0.3 |
| 17 | 0.2 | 0.2 | 0.2 | 0.3 | 0.3 | 0.4 |
| 8 | 0.1 | 0.2 | 0.2 | 0.2 | 0.3 | 0.3 |
| 9 | 0.1 | 0.2 | 0.2 | 0.2 | 0.3 | 0.3 |
| 19 | 0.3 | 0.5 | 0.5 | 0.6 | 0.7 | 0.7 |

The table shows that;

The unprotected sample (Example #1) had a molecular weight of 11,000 mwu at the start of the exposure. It had dropped to 5,500 mwu in 3 hours or 50%. It was 2,200 mwu in 11 hours.

Example #6 had a molecular weight of 10,000 mwu at the start of the exposure. It dropped to 8,000 mwu in 11 hours (20%).

Example #19 likewise showed a drop in molecular weight, similar to #1. The HQMME added is a known antioxidant, but not of the free radical type. It is ineffective in the prevention of degradation.

The molecular weight of several samples was monitored in air under less strenuous conditions. The results were as follows;

| | % Reduction in Mol Weight weeks at 40° C. | | | |
|---|---|---|---|---|
| Example | 1.0 | 2.0 | 3.0 | 4.0 |
| 1 | 0.5 | 0.6 | 0.8 | 0.8 |
| 9 | 0.1 | 0.2 | 0.2 | 0.3 |
| 18 | 0.1 | 0.1 | 0.3 | 0.3 |
| 19 | 0.4 | 0.4 | 0.5 | 0.6 |

What is claimed:

1. A polyoxyalkylene composition which is prepared by the reaction of;
   (a) a dihydroxy compound, selected from ethylene glycol, propylene glycol, diethylene oxide, and dipropylene glycol said dihydroxy compound containing an effective inhibitory amount of a stable free radical compound; and
   (b) an alkylene oxide selected from ethylene oxide, propylene oxide, butylene oxide, and mixtures thereof.

2. A composition of claim 1 wherein the effective inhibitory level stable free radical compound ranges from 1.0% to 0.000000001%.

3. A composition of claim 1 wherein the polyoxyalkylene polymer produced has a molecular weight of 1,000–20,000.

4. A composition of claim 1 wherein the stable free radical is a nitroxide.

5. A composition of claim 1 wherein the stable free radical is di-tert-butyl nitroxide.

6. A composition of claim 1 wherein the polyoxyalkylene compound is based on ethylene oxide.

7. A composition of claim 1 wherein the polyoxyalkylene compound is based on propylene oxide.

8. A composition of claim 1 wherein the polyoxyalkylene compound is based on butylene oxide.

9. A composition of claim 1 wherein the polyoxyalkylene compound is based mixtures of ethylene oxide, propylene oxide and butylene oxide.

10. A process for the preparation of a stable polyoxyalkylene composition which comprises;
    (a) mixing a dihydroxy compound, selected from ethylene glycol, propylene glycol, diethylene glycol, dipropylene glycol with an effective inhibitory amount of a stable free radical compound;
    and reacting said dihydroxy compound mixture with an alkylene oxide selected from ethylene oxide, propylene oxide, butylene oxide, and mixtures thereof.

11. A process of claim 10 wherein the effective inhibitory level stable free radical compound ranges from 1.0% to 0.000000001%.

12. A process of claim 10 wherein the polyoxyalkylene oxide has a molecular weight of 1,000–20,000.

13. A process of claim 10 wherein the stable free radical is a nitroxide.

14. A process of claim 10 wherein the stable free radical is di-tert-butyl nitroxide.

15. A process of claim 10 wherein the polyoxyalkylene compound is based on ethylene oxide.

16. A process of claim 10 wherein the polyoxyalkylene compound is based on propylene oxide.

17. A process of claim 10 wherein the polyoxyalkylene compound is based on butylene oxide.

18. A process of claim 1 wherein the polyoxyalkylene compound is based mixtures of ethylene oxide, propylene oxide and butylene oxide.

* * * * *